(12) United States Patent
Rijnsburger

(10) Patent No.: US 8,666,362 B2
(45) Date of Patent: Mar. 4, 2014

(54) EMERGENCY SERVICE WARNING SYSTEM

(75) Inventor: Jasper Jeroen Rijnsburger, Zwolle (NL)

(73) Assignee: Phyco Trading B.V., Nijkerk (NL)

( * ) Notice: Subject to any disclaimer, the term of this patent is extended or adjusted under 35 U.S.C. 154(b) by 0 days.

(21) Appl. No.: 13/353,977

(22) Filed: Jan. 19, 2012

(65) Prior Publication Data

US 2013/0189945 A1    Jul. 25, 2013

(51) Int. Cl.
  *H04M 11/04*   (2006.01)
(52) U.S. Cl.
  USPC .................. 455/404.2; 455/404.1; 455/414.1; 455/414.2; 455/521
(58) Field of Classification Search
  USPC .............. 455/404.1, 404.2, 414.1, 414.2, 521
  See application file for complete search history.

(56) References Cited

U.S. PATENT DOCUMENTS

| | | |
|---|---|---|
| 6,529,831 B1 | 3/2003 | Smith et al. |
| 6,958,707 B1 | 10/2005 | Siegel |
| 2002/0042290 A1* | 4/2002 | Williams et al. ............... 455/562 |
| 2002/0102992 A1* | 8/2002 | Koorapaty et al. ........... 455/456 |
| 2005/0192746 A1* | 9/2005 | King et al. ..................... 701/213 |
| 2007/0159354 A1 | 7/2007 | Rosenberg |
| 2008/0303660 A1* | 12/2008 | Lombardi ....................... 340/540 |
| 2011/0279312 A1* | 11/2011 | Thomson ................... 342/357.47 |

FOREIGN PATENT DOCUMENTS

| | | |
|---|---|---|
| DE | 102004027953 | 3/2005 |
| EP | 2184725 | 5/2010 |

\* cited by examiner

*Primary Examiner* — Wayne Cai
(74) *Attorney, Agent, or Firm* — Waddey & Patterson, P.C.; Rebecca M. Barnett

(57) ABSTRACT

An emergency service warning system, arranged to warn a user of approach of emergency services, provided with:
  at least one movable emergency service transmitter (T) and at least one stationary base station (M), which emergency service transmitter (T) and base station (M) are arranged to communicate utilizing uplink signals (S) and respective downlink signals (d);
  at least one user receiver (R) which is arranged to detect uplink signals (S) transmitted by the emergency service transmitter (T) and to deliver a warning signal upon detection of an uplink signal (S);
  wherein the user receiver (R) is arranged to search for uplink signals utilizing information concerning the at least one base station.

18 Claims, 1 Drawing Sheet

EMERGENCY SERVICE WARNING SYSTEM

The invention relates to an emergency service warning system, arranged to warn a user of approach of emergency services.

Such a system is known from the European patent application EP2184725 (hereinafter EP'725). The known system can make known the presence of an approaching emergency service vehicle (e.g., an ambulance), to adjust speed depending on the warning signals of the emergency service vehicle being heard and seen.

The system known from EP'725 is provided with at least one movable emergency service transmitter, and with at least one receiver, arranged to receive signals transmitted by the emergency service transmitter. Furthermore, the system comprises at least one stationary base station for the purpose of communication with the emergency service transmitter utilizing emergency service signals. The system is further provided with at least one user receiver which is arranged to detect emergency service signals and to deliver a warning signal upon detection of an emergency service signal.

Emergency services are typically already provided with communication means, for instance, a specific emergency services communication network. Often, such a communication network is well protected from listening in ('monitoring'). Unauthorized persons therefore cannot make use of such an emergency services communication network.

Such a network comprises, for instance, stationary communication units (e.g., radio masts) spread over a relatively large area, and mobile communication equipment (e.g., walkie-talkies, radiophones and the like), which communication equipment can transmit the emergency service signals to the stationary units.

The above-mentioned publication EP'725 teaches the advantageous use of such emergency service communication means, in themselves already in circulation (which normally cannot be monitored by ordinary road users), as part of an emergency service warning system.

In particular, to this end, at least one user receiver is arranged to detect the (in themselves already available) emergency service signals and to deliver a warning signal upon detection of an emergency service signal (coming from a mobile transmitter of an approaching emergency service).

In particular, the system known from EP'725 is arranged to make no use of specific warning transmitters (to be taken along by emergency services) to transmit specific warning signals to user receivers. In this way, emergency services hence do not need to be provided with separate warning transmitters. Thus, a relatively simple, relatively inexpensive, well implementable and particularly efficient warning system can be obtained. Moreover, the emergency services can then use the emergency service signals in unmodified form for their own use, for instance, for internally (i.e., between the emergency services mutually) passing on position information, speech and/or other communication information. Preferably, this internal emergency service communication (i.e., at least comprising the signals transmitted by an emergency service transmitter mentioned) is encrypted in a known manner, so that the content of the emergency service communication cannot be monitored by others (i.e., for instance, ordinary road users, not provided with specific emergency service transmitters).

Thus, a user receiver of the system is, in particular, not arranged to decode signals, for instance, encoded digital signals, transmitted by an emergency service transmitter. Moreover, in particular, the user receiver is not provided with, or associated with, its own emergency service transmitter. Accordingly, a user of the user receiver is unable to transmit emergency service signals.

The present invention contemplates an improvement of the system. In particular, the invention contemplates an emergency service warning system which can alert a user to one or more approaching emergency services in an especially reliable, accurate manner.

To this end, the system according to the invention is characterized by the features of claim 1.

According to the invention, the emergency service warning system is provided with:
  at least one movable emergency service transmitter and at least one stationary base station, which emergency service transmitter and base station are arranged to communicate utilizing uplink signals and respective downlink signals;
  at least one user receiver which is arranged to detect uplink signals transmitted by the emergency service transmitter and to deliver a warning signal upon detection of an uplink signal;
  wherein the user receiver is arranged to search for uplink signals utilizing information concerning the at least one base station.

In particular, the user receiver is arranged to search for the uplink signals transmitted by a (movable) emergency service transmitter mentioned to a (stationary) base station mentioned utilizing information concerning that base station.

In this manner, the warning signal can be delivered in a highly reliable manner. Communication between a stationary base station and mobile emergency service transmitter typically takes place by means of downlink signals (from base station to the emergency service transmitter) and respective uplink signals (from the emergency service transmitter to the base station). A principal idea underlying the invention is to use the base station-specific information for the purpose of generating a warning signal. The base station-specific information can serve, for instance, for verification of detected uplink signals, and/or for support of the search for emergency service transmitter uplink signals.

The system does not need to make use of specific warning transmitters (to be taken along by emergency services) to transmit specific warning signals to user receivers. In this manner, emergency services do no need to be adapted, as is the case, for instance, in the complex and costly systems according to US2007/0159354, DE102004027953, and U.S. Pat. No. 6,529,831.

The uplink signals mentioned are (during use), in particular, transmitted from the emergency service transmitter to the base station, and the (complementary) downlink signals (specifically) belonging to those uplink signals are transmitted in the opposite direction, viz., from the base station mentioned to the emergency service transmitter mentioned.

The uplink signals and downlink signals specifically belonging thereto can be regarded as being two parts of the same communication link between a stationary base station and a mobile (i.e., movable) emergency service transmitter, as is common in radio telecommunication.

The base station-specific information mentioned can, for instance, comprise in itself detection of the downlink signals transmitted by a base station, and/or other information, for instance, predetermined information such as transmission frequency or frequencies and base station position data. In addition to an increased reliability (e.g., preventing error messages) and improved efficiency, in this way an improved accuracy can be achieved.

According to an embodiment the user receiver may be arranged, for instance, to detect both the uplink signals and the downlink signals, and to process the signals, such that delivery of a warning signal also depends on a detected downlink signal.

According to a further elaboration the user receiver is arranged to deliver the warning signal only if along with a (detected) uplink signal a downlink signal matching according to a predetermined relation is present. To this end, the user receiver may be arranged to actually detect that downlink signal. In addition, the user receiver may be arranged to determine whether a base station is present (i.e., in the neighborhood), which base station is associated with that downlink signal.

It is noted that detection of downlink signals is not essential. According to a further elaboration of the invention, use can be made, for instance, of predetermined base station data, comprising information concerning base station positions and downlink transmission frequencies and/or downlink transmission channels. In that case, preferably, also use is made of user receiver position determination, for instance, by means of a GPS receiver. Based on such base station data and instantaneous user receiver position information, the user receiver can investigate whether any, and which, base stations are in the neighborhood, which uplink frequencies/channels those stations communicate with, and whether corresponding uplink signals are present on those frequencies/in those channels.

According to a preferred embodiment a predetermined relation exists between the uplink signals and respective downlink signals. In that case, the user receiver is preferably arranged to investigate whether a (detected or non-detected) downlink signal (or a base station transmitting on respective downlink frequencies/channels) has a detected uplink signal matching according to that predetermined relation.

The above-mentioned predetermined relation can comprise, for instance, a fixed frequency difference, for instance, a fixed frequency difference in the range of 1-20 MHz, for instance, in the case where a communication network used by the emergency service transmitter and receiver is based on the Tetra standard, known per se, such as the C2000 system which is in use in the Netherlands. Such frequency difference then concerns in particular a frequency difference between carrier frequencies of the uplink and corresponding downlink signals.

The predetermined relation mentioned can comprise, for instance, a frequency band channel number, for instance, in the case where a base station has several communication channels in a particular (downlink) frequency band available to transmit downlink signals, and in the case where a mobile emergency service transmitter has several communication channels in another (i.e., uplink) frequency band available to transmit the uplink signals. When a communication link then exists between the base station and the emergency service transmitter, the signals are transmitted in the same channel of each of the respective frequency bands (uplink band and downlink band). (e.g., channel 1, channel 2, channel 3, etcetera).

Further, the user receiver is preferably arranged to determine the signal strength (in particular, field strength) of a received uplink signal, for instance, to be able to assess how far a respective emergency service is removed from the receiver. The receiver can, for instance, deliver a warning signal that depends on a measured strength of a received uplink signal, while the warning signal preferably also depends on a reception direction of the received signal.

According to an especially advantageous elaboration the user receiver is arranged to also receive the downlink signals and to determine the signal strength of received uplink signals and of received downlink signals. In this manner, the user receiver can, for instance, estimate what the distance is (from that receiver) to both a detected base station and a detected emergency service transmitter. Further, it is advantageous if the user receiver is arranged to determine a reception direction of received uplink signals and of received downlink signals. With such information, the user receiver can estimate relative positions of detected base stations and detected emergency service transmitters, with respect to that receiver, and also with respect to each other (i.e., a position of the emergency service transmitter with respect to the base station).

The combination of signal strengths and reception directions of detected uplink signals and respective downlink signals can be processed by the user receiver in different manners, to augment detection reliability. Thus, in particular cases, the strength of an uplink signal transmitted by a mobile emergency service transmitter (transmitted power) appears to depend on the distance between that transmitter and a base station being communicated with. Further, the transmitted power of the emergency service transmitter may be, for instance, settable by the base station. In such cases, it is advantageous if the user receiver is arranged to estimate the transmitted power directly or indirectly, for instance, for the purpose of determining/estimating the distance between the user receiver and the emergency service transmitter.

According to a further advantageous, especially reliable elaboration the user receiver is provided with a GPS receiver to determine a current position of the receiver. The user receiver then preferably disposes of predetermined base station position data (concerning known base stations), alone or in combination with further data of those stations, such as downlink transmission channels (and/or frequencies) used by each station and optionally corresponding uplink channels (and/or frequencies). The receiver may then be arranged, for instance, to determine which base stations are in the neighborhood (based on position information provided by the GPS receiver and the predetermined base station position data), to proceed to search specifically for signals that belong to the channels (and/or frequencies) of those nearby base stations.

As has already been mentioned, further, the user receiver of the system is, in particular, not arranged to decode signals, for instance, encoded digital signals, transmitted by the emergency service transmitter. Moreover, the user receiver is, in particular, not provided with, or associated with, its own emergency service transmitter. Accordingly, a user of the user receiver is unable to transmit emergency service signals.

The present invention further provides a method of delivering a warning in case of an approaching mobile emergency service, for instance, utilizing the system according to the invention, wherein a number of stationary base stations are set up to communicate with emergency services utilizing uplink signals and respective downlink signals, wherein at least one user receiver associated with a user searches for uplink signals utilizing information concerning the base stations.

In this manner, the above-mentioned advantages can be provided.

In addition, the invention provides a user receiver of a system according to the invention, preferably arranged for use in a method according to the invention.

Preferably, the user receiver is arranged to merely detect (the presence of) uplink signals and downlink signals, without deciphering a possible content of the signals.

Further advantageous elaborations of the invention are described in the subclaims. Presently, the invention will be clarified with reference to a non-limiting exemplary embodiment and the drawings. In the drawings:

Like or corresponding features in this application are designated by like or corresponding reference characters.

FIG. 1 shows an example of a system which is provided with movable emergency service transmitters T, and receivers M, R, including base stations M. The emergency service transmitters T and base stations M are arranged to communicate utilizing uplink signals S and respective downlink signals d.

Figure 1:
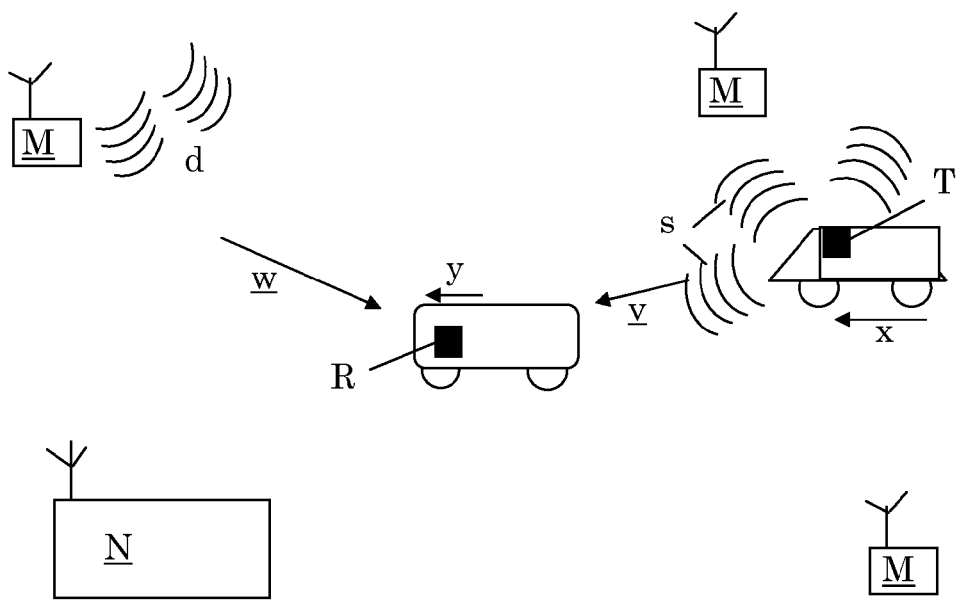
FIG. 1 shows schematically an exemplary embodiment of the invention.

In particular, the system comprises multiple emergency service transmitters T (of which only one is shown) and multiple emergency service base stations M, which are part of a national or regional emergency service communication network. The transmitters T are, in particular, mobile transmitters, which can be carried along, for instance, by emergency services (e.g., vehicles and/or staff, e.g., of ambulance services, police, fire brigade, and the like). An emergency service transmitter T may comprise, for instance, a walkie-talkie, and/or be part of an emergency service vehicle. Arrow x in FIG. 1 designates movement of an emergency service vehicle comprising such a transmitter T.

The system is provided, in particular, with stationary base stations (stationary emergency service transmitter/receiver devices) M for the purpose of communication with the mobile emergency service transmitters T, utilizing uplink signals (i.e., radio signals) S transmitted by the transmitters T and complementary downlink (radio) signals d transmitted by the base station. The base stations M are configured to receive the uplink signals S transmitted by the emergency service transmitters T; the emergency service transmitters T are configured to receive the downlink signals d transmitted by the base stations M. A specific established communication link between base station M and emergency service transmitter T is formed each time by the uplink signals S of that communication link and the complementary downlink signals d, also of that communication link, which is generally known.

The uplink signals S are typically transmitted via uplink channels of an uplink frequency band, while the downlink signals d are transmitted in downlink channels of a downlink frequency band that are complementary to the uplink channels. The downlink frequency band is separate from the uplink frequency band.

According to a further elaboration of the invention both an uplink and downlink frequency band are each above 200 MHz, and, for instance, below 1 GHz. A bandwidth of each frequency band (uplink and downlink) may be, for instance, greater than 1 MHz, and, in particular, at least 5 MHz. The uplink frequency band can comprise, for instance, the frequency range between 380 and 385 MHz. A corresponding downlink frequency band can comprise, for instance, the frequency range between 390 and 395 MHz.

Typically, a predetermined relation exists between the uplink signals S and respective downlink signals d (of the same communication link between an emergency service transmitter T and a base station M). As mentioned earlier, this predetermined relation can comprise a fixed frequency difference, for instance, a fixed frequency difference in the range of 1-20 MHz (e.g., 10 MHz).

The predetermined relation can comprise, in particular, a frequency band channel number. In that case, the downlink frequency band and the uplink frequency band are each subdivided into several channels (sub-bands) with respective channel numbers and corresponding (predetermined) frequencies. During communication between the mobile transmitter T and the base station M, the same channel number is then used by the transmitter T and the station M, in the downlink band and uplink band, respectively.

The uplink and downlink signals can each in themselves comprise different signal types, for instance, continuous signals, intermittent signals and/or the like. The emergency service signals S, d may comprise, for instance, encoded digital signals, a decoded message, speech or other information to be communicated. As already described in EP2184725, the signals S transmitted by mobile emergency services T can comprise, for instance, at least one signal periodically transmitted by the transmitter T (having a constant period of, for instance, one or a few seconds).

The base stations M comprise in particular stationary network stations, for instance, radio masts. The base stations M are, for instance, set up such that a relatively large coverage area, preferably national or regional, is obtained, in order for the emergency services to maintain communicative contact with the network as reliably as possible (via those stations M). According to a further elaboration neighboring base stations M transmit in mutually different downlink channels.

The emergency service communication network T, M may comprise, for instance, a stable and reliable digital communication network arranged, for instance, to transmit speech and data in digitally encoded form from mobile units (which are provided with the transmitters T) via the stations M to one or more central radio rooms N and/or transmitters of other mobile users (not represented). Preferably, the emergency service communication network T, M is based on the Tetra standard, known per se. The network T, M may be, for instance, the C2000 system being in use in the Netherlands, or a similar system. In such a system, an above-mentioned predetermined relation between uplink and complementary downlink signals (at least, carriers thereof) can be a fixed frequency difference in the range of 1-20 MHz.

An aspect of the invention provides an advantageous use of the digital communication network T, M. In particular, the invention provides an emergency service warning system, arranged to warn a user of approach of emergency services, whereby base station information, for instance, the downlink signals d transmitted by the base stations and/or predetermined base station information, can provide extra functionality.

As shown in FIG. 1, to that end, the system is provided with at least one user receiver R which is arranged to detect uplink signals S transmitted by the emergency service transmitter T and to deliver a warning signal upon detection of an uplink signal S. In the example, the user receiver R is arranged, in particular, to detect both the uplink signals S and the downlink signals d, and to process the signals S, d, such that delivery of a warning signal also depends on a detected downlink signal d. Optionally, the user receiver R may be arranged not to receive the downlink signals d directly, but to search for uplink signals S utilizing other base station-specific information (in particular, predetermined base station positions and base station transmission data).

As mentioned, the uplink signals S may be encoded digital signals. The user receiver R is, in particular, not arranged to decode the encoded digital uplink signals S.

Figure 2:
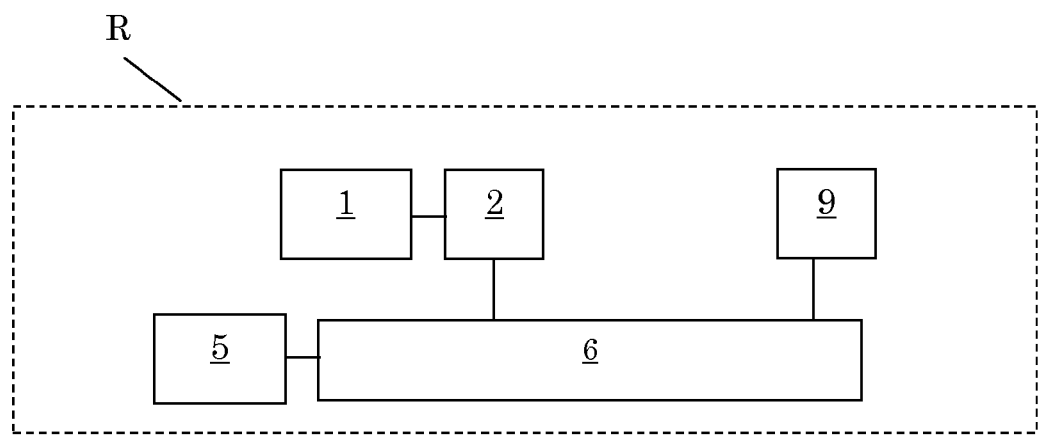
FIG. 2 shows a schematic example of a user receiver according to an exemplary embodiment of the invention.

The user receiver R may be implemented in different manners. A non-limiting example of the receiver is represented in FIG. 2, and is elucidated below.

The receiver R may be designed, for instance, to be portable by a user. The receiver R may be arranged to be coupled to, for instance, built into, a user vehicle. Moreover, the receiver R may, for instance, be part of a user vehicle. The receiver R may, for instance, be provided with means for stable installation of the receiver in a user vehicle.

Thus, FIG. 1 shows schematically a moving (arrow y) user vehicle carrying such a receiver R. In the example, the emergency service vehicle is coming up from behind with respect to the user vehicle, but the system also works, for instance, in case of an oncoming emergency service vehicle. The user receiver R can warn a respective driver (i.e., road user) in a timely manner that an emergency service vehicle is approaching, in order that the user can take measures.

In the example, the user receiver R is arranged to investigate whether a detected uplink signal S has a detected downlink signal d matching according to a predetermined relation (i.e., whether complementary uplink and downlink signals exist in the respective frequency bands).

The receiver R may be arranged, for instance, to determine whether a fixed frequency difference exists between a detected uplink signal S and a detected downlink signal d, in case such a relation between uplink and downlink signals exists. The receiver R is then preferably arranged to establish that a detected uplink signal S and a detected downlink signal d belong together (i.e., provide a communication link between a base station M and mobile transmitter T) if it is determined that the fixed frequency difference between those signals S, d exists. According to a further elaboration, the user receiver R may, for instance, generate a detection signal when it has been established that a detected uplink signal S and a detected downlink signal d belong together (i.e., are used by a base station M and mobile transmitter T for mutual communication).

The receiver R may be arranged, for instance, to determine whether a received uplink signal S and downlink signal d have been transmitted in complementary frequency channels, for instance, frequency channels of the same channel number (of an uplink band and downlink band, respectively). To this end, the receiver R may be arranged, for instance, to detect whether signals S, d are transmitted on the complementary frequencies belonging to each pair of complementary uplink and downlink channels. In that case, the user receiver R can generate a detection signal when it has been established that a detected uplink signal S and a detected downlink signal d are transmitted in complementary channels, and therefore belong together.

The user receiver R may then be arranged, according to a further elaboration, to deliver a warning signal under the influence of such detection signal, to warn a respective user that an emergency service is in the neighborhood.

On the basis of the warning signals, the receiver R can preferably indicate what a rough distance is to, and what a direction is of, the transmitter T that has transmitted the signals. The user receiver R is, for instance, associated with a respective user, for instance, a road user, in particular not being part of the emergency service. The present system is so configured that this user cannot use the user receiver R to have any content of communications transmitted via the communication network T, M, available.

In FIG. 2 an example of a user receiver R is schematically depicted. The receiver R may be provided with, for instance, antenna means 1, receiver means 2, a central control unit 6, and an alert device 9 (e.g., a loudspeaker, display, and/or the like) to deliver a warning signal. Optionally, the user receiver R may be provided with, for instance, a GPS receiver 5.

The antenna means 1, for the purpose of reception of the uplink signals S and downlink signals d, can comprise one or more antennas, for instance, one or more omnidirectional antennas, directional antennas, diversity window antennas and/or phased array antennas. Preferably, antenna means 1 are used that can detect directions of incoming signals. Such directions are shown with vectors v, w in FIG. 1, and comprise a reception direction v of an emergency service transmitter signal S (e.g., measured with respect to a receiver direction of movement y or other direction associated with the receiver R), and a reception direction w of a base station signal d (e.g., likewise measured with respect to the receiver direction of movement y or the other direction associated with the receiver R).

The antenna means 1 are coupled to the receiver means 2 for relay of received signals. The receiver means 2 are configured to process the signals, in particular to verify whether uplink signals S and downlink signals d are being received, and, for instance, in which channels such signals S, d are being received. The receiver means 2 can pass on such information to the central control 6.

The receiver means 2 may be configured in different manners, and may be provided, for instance, with a single broadband receiver part for reception of both uplink and downlink signals, or with two narrowband receiver parts for separate reception of uplink and downlink signals. The receiver means 2 may be provided with suitable signal filtering means, signal amplification means, detector means, and the like, which will be clear to those skilled in the art.

The receiver means 2 may be provided, for instance, with a fast band scanner, arranged to consecutively tune to different channels (in both uplink band and downlink band) to search for signals. Further, the receiver means 2 may be provided, for instance, with a series of detectors, to simultaneously search for incoming signals. In a further embodiment, the receiver means 2 are provided with a frequency spectrum analyzer, to determine whether signals are received in particular radio channels.

The central control unit 6 may also be configured in different manners, and may comprise, for instance, a microcontroller, computer, digital signal processor, a memory, and/or the like. The central control unit 6 may be arranged to receive information from the receiver means 2 concerning detected uplink and downlink signals, for instance, to therewith determine whether complementary uplink and downlink signals are present, for instance, for the purpose of generating a detection signal (via the alert device 9). In the example, the user receiver R is arranged to deliver the warning signal only if a (complementary) downlink signal d matching an uplink signal S is present.

In the example, the receiver R itself has an alert device 9, configured to provide a user with information that the receiver R has observed an emergency service signal. Alternatively, the alert device may be a separate component, which is, for instance, controllable by the receiver R, or is connectable to the receiver, for instance, via a suitable interface.

The optional GPS receiver 5 can determine a current position of the receiver R. Preferably, the user receiver R disposes of predetermined base station data (e.g., stored in an above-mentioned memory). Such data can comprise, for instance, the locations of base stations M (base station position data), and respective downlink channels and/or respective downlink frequencies on which those stations M each transmit. The data preferably comprise the uplink channels and uplink frequencies, respectively, related to those downlink channels and/or downlink frequencies. Optionally, the predetermined base station data comprise certain transmission-specific data, for instance, information concerning transmission direction of one or more of the stations M, information concerning a transmission range of one or more of the stations M, and the like.

The receiver R may be arranged, for instance, to relate received downlink signals d to nearby base stations M on the basis of position information provided by the GPS receiver 5 and the available base station position data. In this manner, the reliability of a channel frequency determination can be increased. Further, the receiver R can accurately locate and accurately distinguish between different nearby base stations M (from which downlink signals d have been received).

Preferably, receiver R is arranged to determine a signal strength of received uplink signals S and of received downlink signals d, and to determine reception directions v, w of the received uplink signals S and of received downlink signals d.

An above-mentioned signal strength is preferably an average signal strength (i.e., averaged over a predetermined time), to average out fluctuations in signal strength measurement. A period of time over which a signal strength averaging is carried out may be, for instance, in the range of 1 ms-1 s, or other period.

Determination of the (average) signal strengths may be carried out, for instance, by the receiver means 2. The receiver means 2 may then be arranged to deliver a respective RSSI ('Received Signal Strength Indication') signal. Determination of the reception directions v, w can be effected by utilization of direction-sensitive antenna means 1. In particular, locations of both the mobile transmitters T and the stationary stations M can be taken bearings of.

Preferably, the user receiver R is arranged to estimate what the distance is to a movable emergency service transmitter T utilizing signal strengths detected by the receiver R and the reception directions v, w of detected uplink signals S and downlink signals d.

A relatively accurate estimate is thus possible also if the movable emergency service transmitter T in itself is arranged to set a transmitted power for transmission of uplink signals S depending on respective downlink signals (coming from that station M), for the purpose of communication with that station M.

The setting/varying of transmitted power by the emergency service transmitter T can be done in different manners, for instance, directly proportionally (continuously or stepwise) to a distance, estimated by that emergency service transmitter T, to the base station M and/or the signal strength of the downlink signal of that station M. Setting the power may be carried out, for instance, utilizing a predetermined protocol. According to a further elaboration, the base station M determines or influences the transmitted power of the emergency service transmitter T, in a manner known per se, utilizing setup information sent to the transmitter T via downlink signals. The base station M may, for instance, instruct the emergency service transmitter T to raise or lower transmitted power if an uplink signal S received by the station M (from transmitter T) is too weak or too strong, respectively. In such cases, the user receiver R is preferably arranged to estimate the emergency service transmitter's transmitted power directly or indirectly for the purpose of the distance determination mentioned (i.e., the distance between user receiver R and mobile emergency service transmitter T).

In particular, the user receiver R can make an estimate on the basis of the signal reception directions v, w, of whether the emergency service transmitter T and a base station M, communicating with each other utilizing complementary signals S, d detected by the receiver R, are relatively far removed from each other, or, conversely, are located relatively close to each other. As follows from the above: in the first-mentioned case the emergency service transmitter T may be set to transmit with a relatively high first transmitted power. In the second case the emergency service transmitter T may be set to transmit with a relatively low second transmitted power.

The result of the transmitted power estimation may then be combined by the user receiver R with a detected signal strength of the uplink signal S of that emergency service transmitter T, to estimate the distance from the user receiver R to that transmitter T.

Further, the user receiver R may be arranged, for instance, first to make an estimate of the distance to the base station M (utilizing signal strength of respective downlink signals). The thus obtained estimate may thereupon be processed by the user receiver R in the estimation of the distance to an emergency service transmitter T which communicates with that station M utilizing a measured signal strength of the respective uplink signals.

In an especially advantageous embodiment, the user receiver R can utilize the predetermined base station data and a current position determined by the GPS receiver 5, to determine the location of the respective base station M. Preferably, the receiver R is then arranged to determine a current location via its GPS receiver, and thereupon to determine, utilizing the available (predetermined) base station data, which base stations M are in the neighborhood. A next step comprises retrieving further information concerning nearby stations M, contained in the base station data, such as currently used downlink channels (and/or frequencies) and respective uplink channels (and/or frequencies), and tuning to those channels (and/or frequencies) of the nearby base stations M to search for signals. Preferably, the user receiver then searches at least on the specific uplink channels belonging to nearby stations M (and/or at the uplink frequencies) for uplink signals, for the purpose of detection of emergency services.

Further, accuracy and efficiency can be augmented when the user receiver R disposes of the predetermined transmission-specific data, for instance, transmitter range and/or transmission direction of one or more base stations M. With such data the user receiver R can distinguish between neighboring base stations especially well. The user receiver R may be configured, for instance, to search only for base stations that will be detectable according to these transmission-specific data (i.e., the user receiver R is located within the transmission or communication range, the 'cell', of the station M).

Use of the system comprises a method of delivering a warning in the event of an approaching mobile emergency service T. The stationary base stations M can communicate with emergency services utilizing the uplink signals S and respective downlink signals d.

In the example, the user receiver R associated with a user can deliver a warning signal if an uplink signal S and a corresponding (complementary) downlink signal d are received by that receiver R. Here, the user receiver R can investigate in an above-described manner whether a detected uplink signal S has a detected downlink signal d matching according to the predetermined relation, which means that a communication link between a nearby emergency service T and a base station M has been detected.

The receiver R can then preferably determine whether a received uplink signal S and downlink signal d have been transmitted in complementary frequency channels, and generates, for instance, a detection signal when this proves to be the case. Thereafter, the user receiver R can deliver a warning signal, via the alert device 9. The warning signal preferably contains further information, such as the estimated distance to the emergency service transmitter T and/or the direction.

During use, the user receiver R preferably determines signal strengths of received uplink signals S and of received downlink signals d, as well as reception directions of received uplink signals S and of received downlink signals d. This information can then be processed by the user receiver R to estimate the distance to the emergency service transmitter T, for instance, together with an above-described emergency service transmitted power estimate.

Preferably, an above-mentioned GPS receiver is used in combination with predetermined base station data, for instance, to establish that the user receiver R is within the range of one or more base stations M, to verify which stations they are. This may even serve as an alternative to detection of the downlink signals d, in particular when it is known to which uplink frequencies/channels those stations are tuned. In that case, the user receiver R only needs to tune to uplink channels/frequencies in respect of which it has been established by the user receiver R that respective base stations M are in the neighborhood (i.e., that the user receiver R is within the range of those stations M), to search for mobile emergency service transmitters T.

In addition, the GPS receiver and predetermined base station data may be configured in combination with downlink signal detection, for instance, for the purpose of verification of measurements and/or to detect base stations M of which no predetermined data are available (yet).

Further, the user receiver R may be arranged, for instance, to give a warning signal only if it appears that a detected emergency service transmitter T is within a defined distance (e.g., less than 1 km) from the receiver R, and/or when a signal strength of a received uplink signal S is above a defined threshold value.

In addition, the user receiver R may be arranged, for instance, to give a warning signal only if it appears that a detected emergency service transmitter is approaching the receiver R, for instance, if an (average) signal strength of a received uplink signal S increases.

The system described hereinabove is particularly well suited for use by road users. Thus, the user receiver R can inform a road user of an approaching emergency service in a timely manner, independently of whether or not warning signals (siren, flashing light) are being used by the emergency service. The receiver R may, for instance, warn the road user, for instance, automatically with suitable acoustic and visual signals if on a base station M complementary uplink radio signals S have been recognized by the receiver R. This has a safety enhancing effect, in particular if, for instance, an accident has taken place, in bad weather conditions (fog, snow, or heavy rainfall). The user receiver R is relatively accurate and reliable and can prevent error messages particularly well.

By making use of the optional GPS receiver 5, the system, moreover, can be expanded in a simple manner, to store emergency service locations (automatically) in a central, external database. In this manner, emergency service locations may be shared with other drivers, to provide extra safety. As mentioned, GPS data may moreover be used in the detection of mobile emergency service transmitters T as such.

It will be self-evident that the invention is not limited to the exemplary embodiment described. Various modifications are possible within the scope of the invention as is set forth in the appended claims.

Thus, the term "a" in this application can mean, for instance, just one, at least one, or a plurality of.

Furthermore, a communication between the stationary base station and the emergency service transmitter can comprise, for instance, at least transmission of radio signals from the transmitter to the receiver.

According to a further elaboration, the mobile transmitter is part of a mobile emergency service communication unit (e.g., a walkie-talkie), arranged to provide two-way communication via the emergency service communication network.

A warning signal to be produced by (or under the influence of) the user receiver may comprise, for instance, an acoustic signal, a visual signal, or both, or any other suitable warning signal.

Further, in the present application the "uplink signals" mentioned may be called, for instance, "first signals of the communication link", and the "downlink signals" may be called, for instance, "the second signals of the communication link belonging to those first signals", wherein the communication link is a specific (radio) communication link present between the base station (M) and an emergency service transmitter (T), and wherein the first signals are transmitted from the emergency service transmitter (T) to the base station (M), and wherein the second signals are transmitted from the base station (M) to the emergency service transmitter (T).

The invention claimed is:

1. An emergency service warning system, arranged to warn a user of approach of emergency services, comprising:
    at least one movable emergency service transmitter and at least one stationary base station, wherein the emergency service transmitter and the at least one stationary base station are arranged to communicate by utilizing encoded digital uplink signals and respective downlink signals; and
    at least one user receiver which is arranged to detect encoded digital uplink signals transmitted by the emergency service transmitter to the base station, without deciphering a possible content of the encoded digital uplink signals, and to deliver a warning signal upon detection of an encoded digital uplink signal;
    wherein the user receiver is arranged to search for the encoded digital uplink signals transmitted by an emergency service transmitter to the base station utilizing information concerning the base station.

2. A system according to claim 1, wherein the information concerning the at least one base station:
    comprises downlink signals transmitted by the at least one base station; and/or
    comprises predetermined information concerning the at least one base station, for instance, transmission frequency or frequencies and/or base station position data concerning the at least one base station.

3. A system according to claim 2, wherein the user receiver is arranged to detect downlink signals transmitted by the at least one base station, for the purpose of searching for the encoded digital uplink signals.

4. A system according to claim 1, wherein the user receiver is arranged to detect downlink signals transmitted by the at least one base station, for the purpose of searching for the uplink signals.

5. A system according to claim 1, wherein a predetermined relation exists between the encoded digital uplink signals and the respective downlink signals transmitted by the at least one base station, wherein the user receiver is arranged to investigate whether said predetermined relation is present utilizing the information concerning the at least one base station.

6. A system according to claim 5, wherein the predetermined relation comprises a fixed frequency difference in the range of 1-20 MHz.

7. A system according to claim 6, wherein the predetermined relation comprises a frequency band channel number.

8. A system according to claim 5, wherein the predetermined relation comprises a frequency band channel number.

9. A system according to claim 5, wherein the predetermined relation comprises a fixed frequency difference of 10 MHz.

10. A system according to claim 1, wherein the receiver is arranged to also receive said downlink signals, and to determine a signal strength of received encoded digital uplink signals and a signal strength of received downlink signals.

11. A system according to claim 10, wherein the user receiver is arranged to estimate what the distance is to a said movable emergency service transmitter utilizing:
   a signal strength of a detected encoded digital uplink signal; and
   a signal strength of a respective detected downlink signal.

12. A system according to claim 1, wherein the receiver is arranged to also receive said downlink signals, and to determine a reception direction of received uplink signals and a reception direction of received downlink signals.

13. A system according to claim 1, wherein the user receiver is provided with a GPS receiver to determine a current position of the receiver, wherein the user receiver disposes of predetermined base station position data, wherein the receiver is arranged to verify which at least one base station is in a neighborhood by utilizing a current position determined by the GPS receiver and the base station position data.

14. A method of delivering a warning in case of an approaching mobile emergency service, comprising the step of:
   utilizing a system, comprising:
      at least one movable emergency service transmitter and at least one stationary base station, wherein the emergency service transmitter and the at least one stationary base station are arranged to communicate by utilizing encoded digital uplink signals and respective downlink signals; and
      at least one user receiver which is arranged to detect encoded digital uplink signals transmitted by the emergency service transmitter to the at least one stationary base station, without deciphering a possible content of the encoded digital uplink signals, and to deliver a warning signal upon detection of an encoded digital uplink signal;
   wherein the user receiver is arranged to search for the encoded digital uplink signals transmitted by an emergency service transmitter to the at least one stationary base station utilizing information concerning the base station
   wherein the at least one stationary base station is set up to communicate with emergency services by utilizing uplink encoded digital signals and respective downlink signals, wherein at least one user receiver associated with a user searches for encoded digital uplink signals utilizing information concerning the at least one stationary base station.

15. A method according to claim 14, wherein a predetermined relation exists between the encoded digital uplink signals and respective downlink signals, wherein the user receiver searches for the at least one stationary base station, as well as for encoded digital uplink signals corresponding according to said relation.

16. A method according to claim 15, wherein the predetermined relation comprises a fixed frequency difference of 10 MHz.

17. A method according to claim 16, wherein the predetermined relation comprises a frequency band channel number.

18. A method according to claim 15, wherein the predetermined relation comprises a frequency band channel number.

* * * * *